US012428271B2

(12) United States Patent
Lu et al.

(10) Patent No.: US 12,428,271 B2
(45) Date of Patent: Sep. 30, 2025

(54) SCENE SELF-ADAPTIVE METHOD FOR CONTROLLING UNMANNED DRIVING OF MONORAIL HOIST TRANSPORTATION ROBOT

(71) Applicants: China University of Mining and Technology, Jiangsu (CN); Xuzhou Liren Monorail Transportation Equipment Co., Ltd., Jiangsu (CN)

(72) Inventors: Hao Lu, Jiangsu (CN); Zhencai Zhu, Jiangsu (CN); Yuxing Peng, Jiangsu (CN); Mai Du, Jiangsu (CN); Hongxiang Jiang, Jiangsu (CN); Qingguo Wang, Jiangsu (CN)

(73) Assignees: China University of Mining and Technology, Jiangsu (CN); Xuzhou Liren Monorail Transportation Equipment Co., Ltd., Jiangsu (CN)

( * ) Notice: Subject to any disclaimer, the term of this patent is extended or adjusted under 35 U.S.C. 154(b) by 0 days.

(21) Appl. No.: 18/840,913

(22) PCT Filed: Aug. 3, 2023

(86) PCT No.: PCT/CN2023/110996
§ 371 (c)(1),
(2) Date: Aug. 23, 2024

(87) PCT Pub. No.: WO2024/131078
PCT Pub. Date: Jun. 27, 2024

(65) Prior Publication Data
US 2025/0162843 A1 May 22, 2025

(30) Foreign Application Priority Data
Dec. 21, 2022 (CN) .......................... 202211655174.2

(51) Int. Cl.
*B66C 13/48* (2006.01)
*B66C 13/46* (2006.01)
*B66C 15/00* (2006.01)

(52) U.S. Cl.
CPC .............. *B66C 13/48* (2013.01); *B66C 13/46* (2013.01); *B66C 15/00* (2013.01)

(58) Field of Classification Search
CPC .......... B66C 13/48; B66C 13/46; B66C 15/00
See application file for complete search history.

(56) References Cited

U.S. PATENT DOCUMENTS 11,436,484 B2 * 9/2022 Farabet .................... G05D 1/00
11,461,963 B2 * 10/2022 Manivasagam ........ G05D 1/249
(Continued)

FOREIGN PATENT DOCUMENTS

CN 110489828 11/2019
CN 111061167 4/2020
(Continued)

OTHER PUBLICATIONS

Yang et al. (https://www.mdpi.com/2076-3417/12/12/6030) (Year: 2022).*
(Continued)

*Primary Examiner* — Ig T An
(74) *Attorney, Agent, or Firm* — JC ONE WORLD

(57) ABSTRACT

The present disclosure discloses a scene self-adaptive method for controlling an unmanned driving of a monorail hoist transportation robot. The method comprises the following steps: constructing an industrial internet of things platform for a monorail hoist; constructing a digital twin system for the monorail hoist; controlling a virtual unmanned driving of the monorail hoist; establishing a shadow following model for the monorail hoist; controlling an entity monorail hoist in real time by a virtual monorail (Continued)

hoist; comparing the entity monorail hoist driven by data with the monorail hoist driven by a driver with the shadow following mode; and designing a self-adaptive program for complex scenes: improving a loading velocity of a new roadway scene through merging root nodes and compressing data, implementing an environment self-adaptation, a platform self-adaptation, and a terminal self-adaptation.

8 Claims, 4 Drawing Sheets

(56) References Cited

U.S. PATENT DOCUMENTS

| | | | |
|---|---|---|---|
| 2021/0309248 A1* | 10/2021 | Choe | G06N 3/04 |
| 2022/0253994 A1* | 8/2022 | Yamagami | G06V 20/59 |
| 2022/0374428 A1* | 11/2022 | Nassar | G06F 16/284 |
| 2023/0080379 A1 | 3/2023 | Rider et al. | |

FOREIGN PATENT DOCUMENTS

| | | |
|---|---|---|
| CN | 113359709 | 9/2021 |
| CN | 114488852 | 5/2022 |
| CN | 115290110 | 11/2022 |
| CN | 116081488 | 5/2023 |

OTHER PUBLICATIONS

"International Search Report (Form PCT/ISA/210) of PCT/CN2023/110996," mailed on Dec. 6, 2023, with English translation thereof, pp. 1-4.

"Written Opinion of the International Searching Authority (Form PCT/ISA/237) of PCT/CN2023/110996," mailed on Dec. 6, 2023, with English translation thereof, pp. 1-9.

* cited by examiner

SCENE SELF-ADAPTIVE METHOD FOR CONTROLLING UNMANNED DRIVING OF MONORAIL HOIST TRANSPORTATION ROBOT

CROSS-REFERENCE TO RELATED APPLICATION

This application is a 371 of international application of PCT application serial no. PCT/CN2023/110996, filed on Aug. 3, 2023, which claims the priority benefit of China application no. 202211655174.2 filed on Dec. 21, 2022. The entirety of each of the above mentioned patent applications is hereby incorporated by reference herein and made a part of this specification.

TECHNICAL FIELD

The present disclosure relates to the field of unmanned driving transportation robots, specifically to a scene self-adaptive method for controlling an unmanned driving of a monorail hoist transportation robot.

RELATED ART

The unmanned driving technology is an important part of the intelligent mining. The unmanned driving technology can improve the production efficiency of the mining, improve the production capacity of the mines, and enhance the development ability of the mineral resources. The digital twin technology can implement the intelligent operation and maintenance work of the equipment such as the simulation solution of the multi-coupling model, the analysis of the key structure, the safety assessment of the equipment operation, the real-time diagnosis of the equipment failure, the monitoring and optimization of the equipment, the online user interaction, and the visual monitoring of the equipment. When the digital twin technology is served as a key technology to drive the unmanned driving training, the digital twin technology has the advantages of the complete training system (coupling and constructing the multi-dimensional model), the excellent linkage between the virtuality and the reality, the real-time data updating, and the excellent prediction performance.

The shadow mode refers to form a closed loop of the monorail hoist operation data, the roadway environment data and the neural network algorithm, and eventually to form a snowball effect. The more monorail hoist auxiliary transportation systems using the shadow mode are, the more roadway scenes can be collected, and the more data the neural network terminal are received. For the neural network algorithm, data are the nourishment, the shadow mode provides a steady stream of nourishment to help the neural network algorithm grow and mature continuously. The more mature the algorithm, the better the unmanned driving safety of the monorail hoist, which drives more monorail hoist systems to apply this method for unmanned driving training.

The Chinese patent application with the publication number of CN110489828A provides a virtual test platform for an unmanned vehicle. As the prior art, the training cost of the virtual test platform is still high, and the data acquisition function of the unmanned control model is not perfect. The Chinese patent application with the publication number of CN114488852A provides a virtual simulation system and a method for an unmanned vehicle facing the off-road environment, which cannot implement the complex functions of the emergency braking, the deceleration operation, the acceleration operation, and the track-varying operation during avoiding the obstacles, and cannot implement the all-round real-time monitoring, and the prediction accuracy of the training model is not high. The Chinese patent application with the publication number of CN111061167A provides a test method and a virtual test platform for the mixed reality automatic driving in the intelligent network demonstration area, which cannot design the self-adaptive program in the updating of the complex scenes, and cannot improve the loading velocity of the new roadway scene, and cannot implement the environment self-adaptation, the platform self-adaptation, and the terminal self-adaptation.

SUMMARY OF INVENTION

In view of the above-mentioned technical deficiencies, the objectives of the present disclosure are to provide a scene self-adaptive method for controlling an unmanned driving of a monorail hoist transportation robot, which designs a self-adaptive program in the updating of the complex scenes. During a process of using this method, the training can be rapidly implemented according to the specific underground environment.

In order to solve the above-mentioned technical problems, the technical solutions adopted in the present disclosure are as follows.

A scene self-adaptive method for controlling an unmanned driving of a monorail hoist transportation robot is provided in the present disclosure. The method comprises following steps.

In S1, an industrial internet of things platform for a monorail hoist is constructed, the construction of the industrial internet of thins platform includes a data acquisition, a network communication, a cloud server and a client.

In S2, a digital twin system for the monorail hoist is constructed, the construction of the digital twin system includes a model construction, a model operation and controlling, and a network communication.

In S3, a virtual unmanned driving of the monorail hoist is controlled, that is, the point cloud data and image data are acquired, and the virtual unmanned driving is trained.

In S4, a shadow mode for the monorail hoist is established, that is, a shadow program is operated in a background, and a output instruction of the shadow following-mode is compared with an output instruction of the reality.

In S5, an entity monorail hoist is controlled in real time by a virtual monorail hoist, a data transmission and a state synchronization between a virtual model and the monorail hoist are completed through an OPC UA communication protocol.

In S6, the entity monorail hoist driven by data is compared with the monorail hoist driven by a driver with the shadow mode.

In S7, a self-adaptive program for the complex scenes is designed, a loading velocity of a new roadway scene is improved through merging root nodes and data compression, and an environment self-adaption, a platform self-adaption, and a terminal self-adaption are implemented.

Preferably, in step S1, an ARM processor is served as a control module, and a camera module is served as an acquisition device for acquiring data. Driving data for the monorail hoist are obtained by utilizing a millimeter-wave laser radar and a multi-sensor fusion. Special operating conditions are recorded based on production data for mines. A WIFI technology is served as a network communication technology for implementing wireless communication. A data processing server, a database server and a Web server are served as cloud servers, and eventually data are displayed on a display terminal.

Preferably, in step S2, a digital twin of the monorail hoist is constructed layer by layer. A physical layer, a virtual layer, a perception layer and a shared layer are sequentially established to further establish an operation and control model for the monorail hoist, and the client is in communication connection with a server by utilizing a WIFI or a Socket to establish the digital twin system for the monorail hoist.

Preferably, in step S3, in a Unity 3D, virtual roadway scene information is acquired. a virtual laser radar is constructed, the point cloud data for the scene are generated, and a velocity of the monorail hoist and a position where the monorail hoist is located in a track are obtained. The real-time scene image data for the roadway are acquired by utilizing a camera in the Unity 3D as a virtual vision camera. The control operation driven by an underground driver based on a FPV terminal is acquired, and the monorail hoist is controlled to drive based on a control instruction corresponding to the control operation.

Then, a script is written in the Unity to enable the monorail hoist transportation robot to follow this path. A A*pathfinding algorithm is implemented by utilizing a C# in the Unity 3D, and the control programs of the deceleration operation, the tack-varying operation, the emergency braking and the intelligent obstacle avoidance are written in the C# script. Whether the driving process of the unmanned driving in the Unity 3D is normal is detected. When the driving process is abnormal, the method is transferred to perform the steps of acquiring the point cloud data and the scene image of the road where the monorail hoist currently drives based on the FPV to perform the optimal training for the model, and performing a quantity of trainings for all complex operating conditions, and perceiving different situations based on different underground complex operating conditions to obtain various data.

Preferably, in step S4, an ADAS hardware is pre-embedded for the monorail hoist, the differences between the output instruction of the program and the output instruction of the reality are compared to implement the basic function of the shadow mode.

Preferably, in step S5, in a data transmission system, a PLC is taken as a core, and a data information interaction is performed through a servo drive, a sensor, a touch screen and the monorail hoist.

Preferably, in step S6, an input instruction of a driving of the entity monorail hoist is compared with an output instruction of a trained shadow mode, the data difference values for the driving time, the braking times, the acceleration times, the deceleration times between the entity monorail hoist and the trained shadow mode are served as the quantification indexes for evaluating the accuracy of the virtual unmanned driving. The above data different values are weighted and averaged, and a value of N is given as a standard for determining whether the prediction accuracy satisfies the requirement, $$N = k_1 m + k_2 a + k_3 b + k_4 c,$$

where $k_1$ denotes the weight of the difference value for the driving time in the formula, $k_2$ denotes the weight of the difference value for the braking times in the formula, $k_3$ denotes the weight of the difference value for the acceleration times in the formula, $k_4$ denotes the weight of the difference value for the deceleration times in the formula, m denotes the difference value for the driving time, a denotes the difference value for the braking times, b denotes the difference value for the acceleration times, c denotes the difference value for the deceleration times. When the prediction accuracy is insufficient, the artificial intelligence iterative training is performed on the virtual unmanned driving control model until the prediction accuracy reaches the available standard.

Preferably, in step S7, a scene loading program is preprocessed in the designing of the program in this method.

Firstly, the segmented Tile and the LOD loading module are established for the real-scene three-dimensional scene data, multi-level root nodes are formed by merging Tile on the top level of the LOD to the maximum extent for multiple times, which greatly improves the browsing velocity, and further reduces the pyramid level of the root nodes of the real-scene 3D data, reduces the data volume of the data rendering scheduling, and improves the efficiency of the rendering scheduling.

Secondly, the texture compression is performed on the real-scene 3D data, which sufficiently considers the requirements of platform browsing, implements the rapid loading of the texture compression packages in different browsers and terminal operating systems, and implements the high-speed rendering. Thirdly, the operations such as the triangular mesh compression, the point cloud compression, and the data file compression are performed.

Finally, the real-scene 3D data are rapidly released and shared, which improves the loading and browsing velocity of the new roadway environment, and achieves the purposes of the environment adaptation, the platform adaptation, and terminal adaptation.

The beneficial effects of the present disclosure are as follows.

1. The present disclosure not only utilizes the virtual unmanned driving experiment to increase the quantity of the simulated data, simulates a quantity of the special operating conditions, and further reduces the training costs, but also utilizes the virtual laser radar to obtain the point cloud data for the roadway scene, the velocity of the monorail hoist and the position where the monorail hoist is located in the track. The real-time scene data for the roadway are obtained by utilizing the virtual vision camera to improve the data acquisition function of the unmanned driving control model.
2. The present disclosure can not only satisfy the simulation training requirements of the unmanned vehicles under the extreme underground operating conditions, and implement the intelligent obstacle avoidance function by combining an A*pathfinding algorithm with a C#, but also implement the complex functions of the emergency braking, the deceleration operation, the acceleration operation and the track-varying operation.
3. The present disclosure implements the functions such as the all-round real-time monitoring by utilizing the virtual laser radar and the virtual vision camera, iteratively trains the unmanned driving control model by utilizing the reinforcement learning algorithm, determines the quantification accuracy indexes, and improves the prediction accuracy of the training model.
4. The present disclosures improves the training efficiency of the unmanned driving control model, designs the self-adaptive program in the updating of the complex scenes, improves the loading velocity of the new roadway scene, implements the environment self-adaptation, the platform self-adaptation and the terminal self-adaptation. In the process of using this method, the training can be rapidly implemented according to the specific underground environment.

BRIEF DESCRIPTION OF DRAWINGS

In order to describe the embodiments of the present disclosure or the technical solutions in the prior art more clearly, the following briefly introduces the accompanying drawings that is required to be used in the descriptions of the embodiments or the prior art. It will be apparent that the accompanying drawings in the following description are merely some embodiments of the present disclosure. For those of ordinary skill in the art, other accompanying drawings can also be obtained according to these accompanying drawings without any creative efforts.

DESCRIPTION OF EMBODIMENTS

The following clearly and completely describes the technical solutions in embodiments of the present disclosure with reference to the accompanying drawings in the embodiments of the present disclosure. It will be apparent that the described embodiments are merely some but not all of the embodiments of the present disclosure. All other embodiments obtained by a person of ordinary skill in the art based on the embodiments of the present disclosure without creative effects shall fall within the protection scope of the present disclosure.

As illustrated in FIG. 1 to FIG. 4, provided is a scene self-adaptive method for controlling an unmanned driving of a monorail hoist transportation robot. The method includes the following steps.

In step S1, an ARM processor is served as a control module, and a camera module is served as an acquisition device for acquiring data. The driving data for the monorail hoist are obtained by utilizing a millimeter-wave laser radar and a multi-sensor fusion. The special operating conditions are recorded based on the production data for the mines. A WIFI technology is served as a network communication technology for implementing a wireless communication. The data processing server, the database server and the Web server are served as the cloud servers, and eventually the data are displayed on a display terminal.

Figure 1:
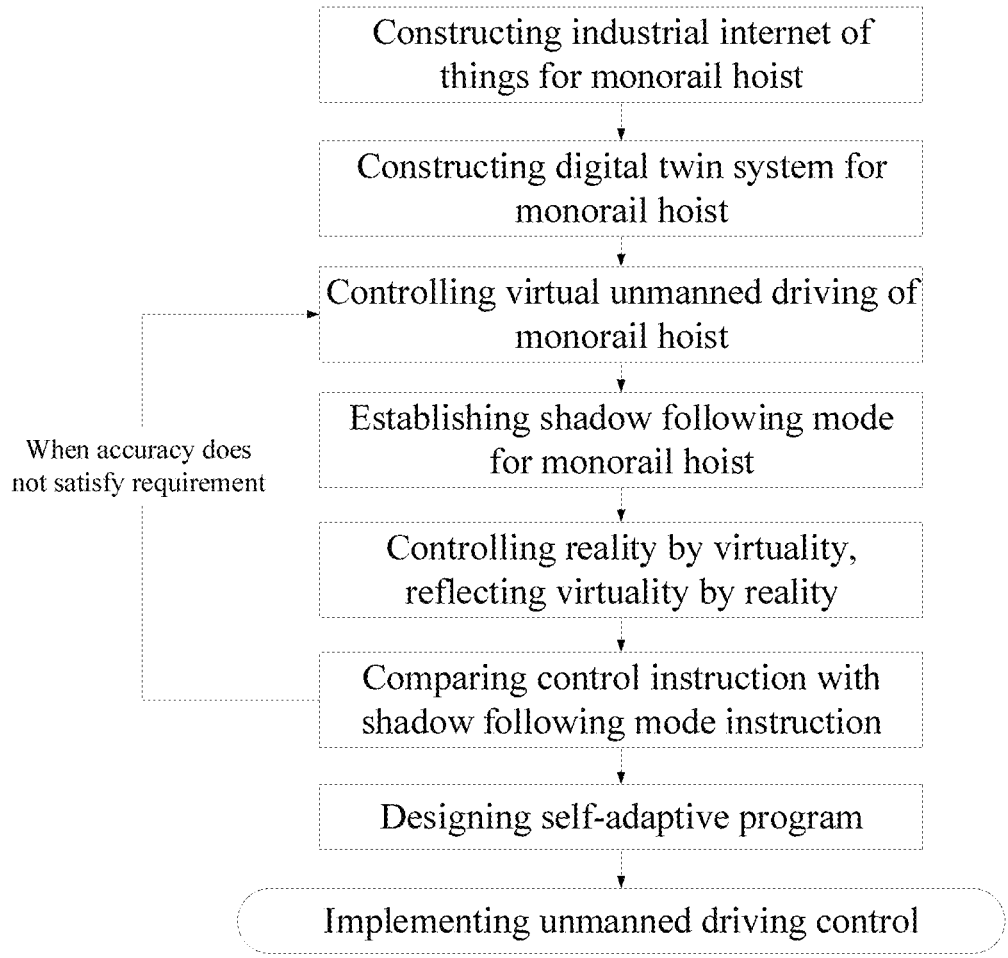
FIG. 1 illustrates a flow chart of the steps of a scene self-adaptive method for controlling an unmanned driving of a monorail hoist transportation robot provided by an embodiment of the present disclosure.
Figure 2:
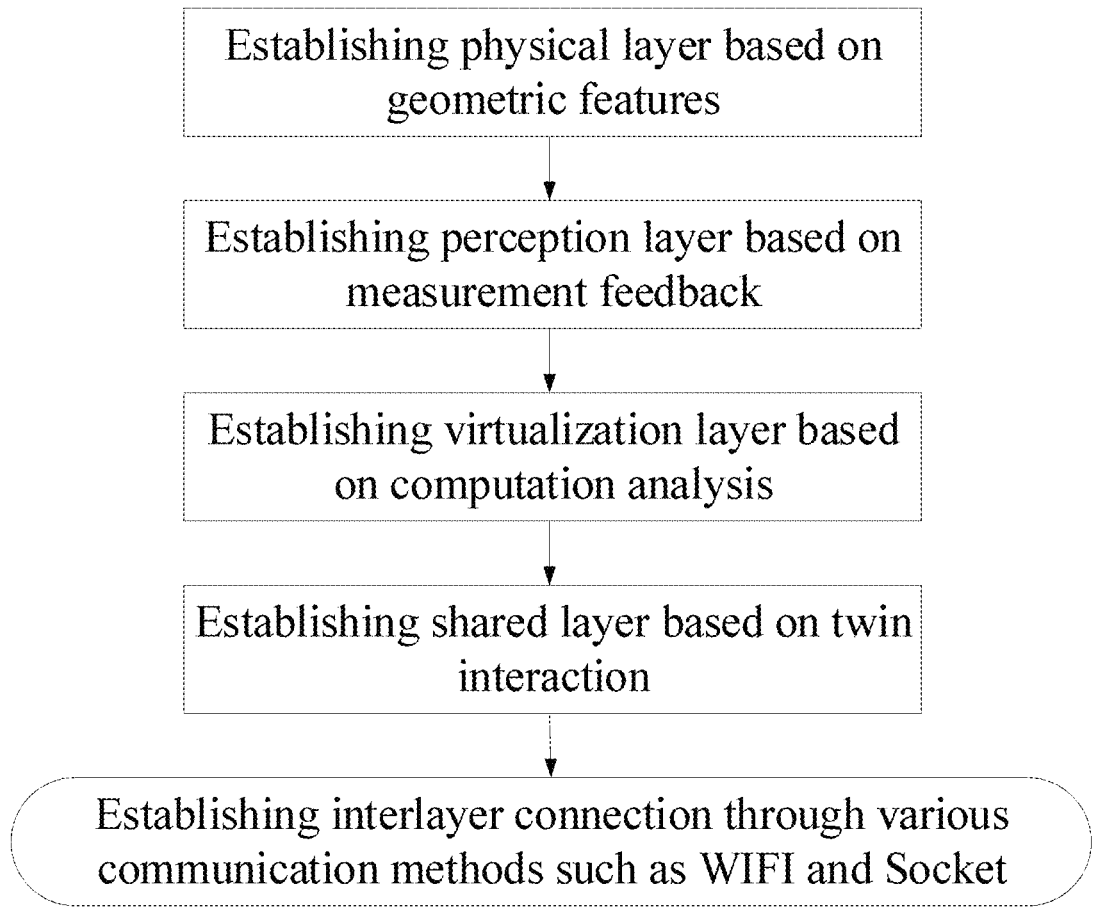
FIG. 2 illustrates a flowchart for generating a digital twin system for the monorail hoist provided by an embodiment of the present disclosure.

In step S2, a digital twin of the monorail hoist is constructed layer by layer, a physical layer, a virtual layer, a perception layer, and a shared layer are sequentially established to further establish an operation and control model for the monorail hoist, the client is in communication connection with the server by utilizing a Socket to establish the digital twin of the monorail hoist, and the flow path is as illustrated in FIG. 2.

Figure 3:
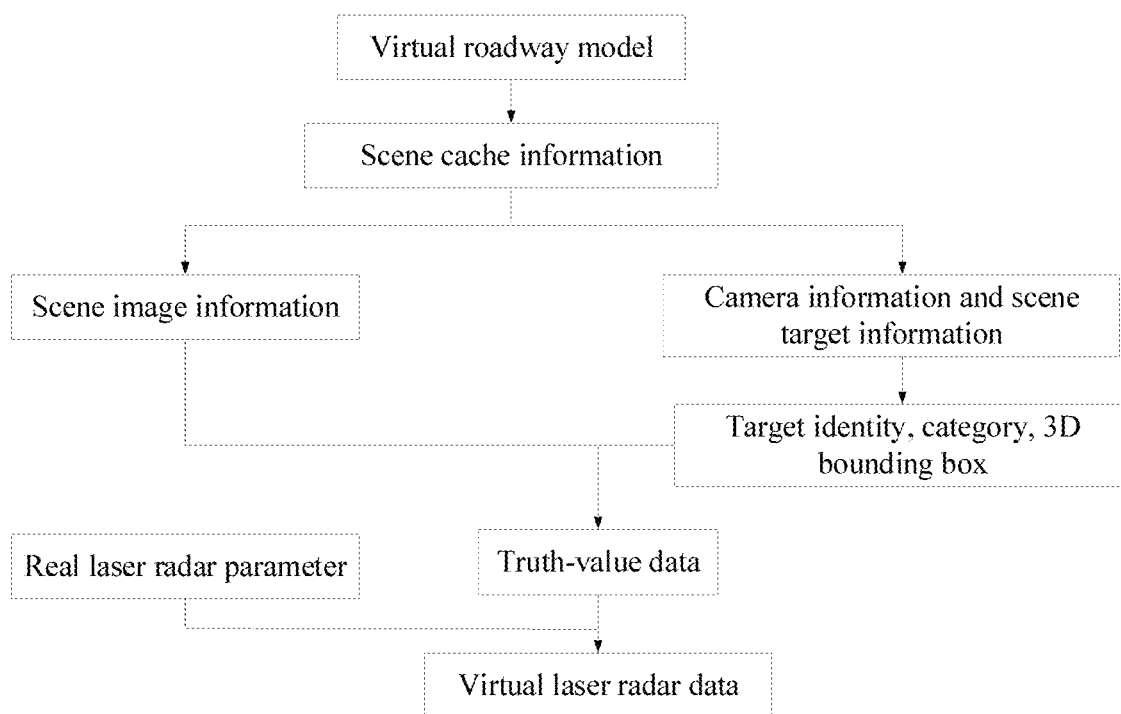
FIG. 3 illustrates a method for generating virtual laser radar data based on a virtual roadway scene model provided by an embodiment of the present disclosure.

In step S3, as illustrated in FIG. 3, in a Unity 3D, the virtual roadway scene information is acquired, the virtual laser radar is constructed, the point clod data for the scene are generated, and the velocity of the monorail hoist and the position where the monorail hoist is located in the track are obtained. The real-time scene image data for the roadway are acquired by utilizing the camera in the Unity 3D as a virtual vision camera.

Figure 4:
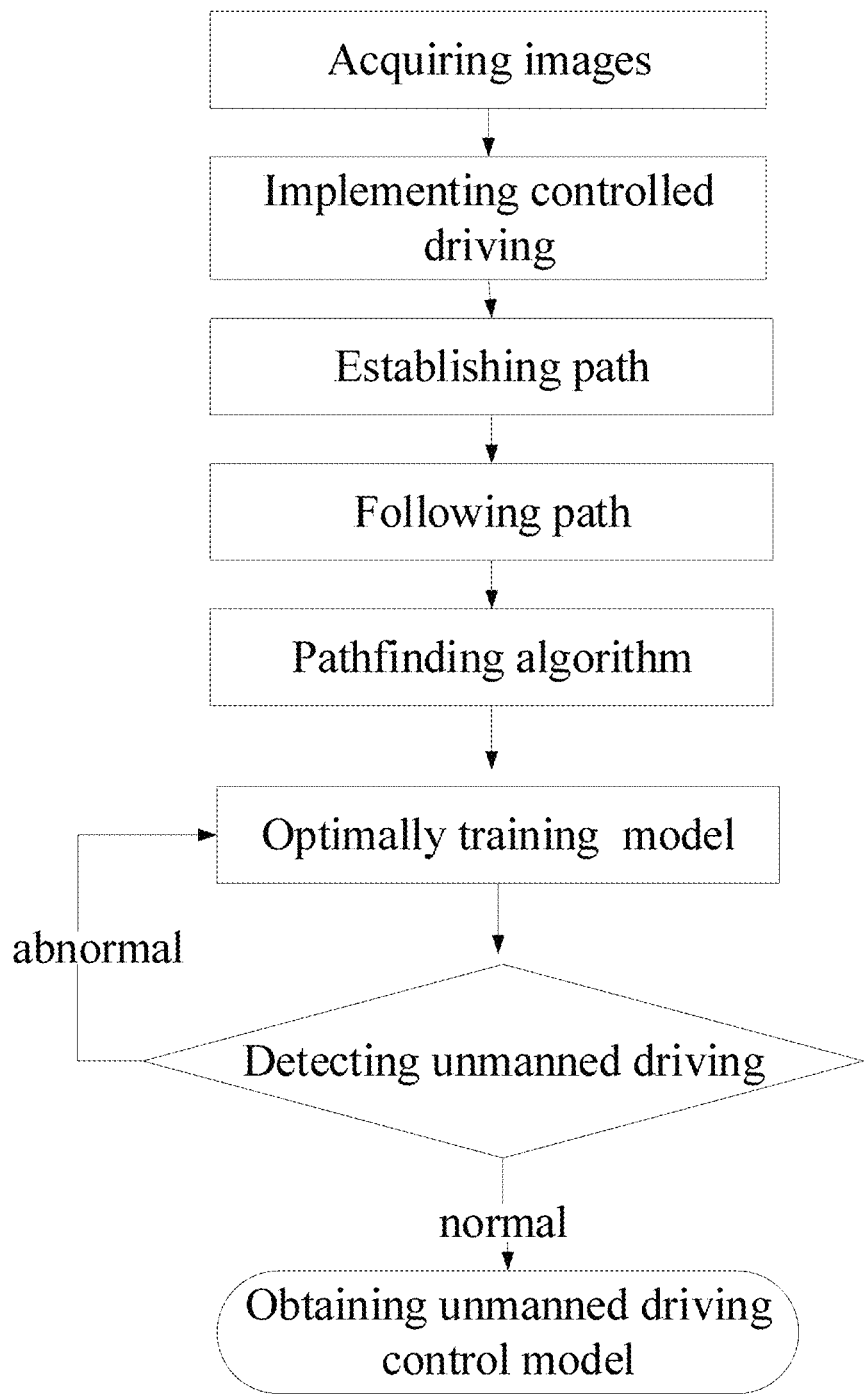
FIG. 4 illustrates a method for generating an unmanned driving control model provided by an embodiment of the present disclosure.

As illustrated in FIG. 4, the control operation driven by an underground driver based on a FPV terminal is obtained, and the monorail hoist is controlled to drive based on the control instruction corresponding to the control operation. Then, a script is written in Unity to enable the monorail hoist transportation robot to follow this path. A*pathfinding algorithm is implemented by utilizing a C# in the Unity3D, and the control programs of the deceleration operation, the track-varying operation, the emergency braking and the intelligent obstacle avoidance are written in the C# script.

Whether the driving process of the unmanned driving in the Unity 3D is normal is detected. When the driving process is abnormal, the method is transferred to perform the steps of acquiring the point cloud data and the scene image of the road where the monorail hoist currently drives on based on the FPV to perform the optimal training for the model, performing a quantity of trainings for all complex operating conditions, and perceiving different situations based on different underground complex operating conditions to obtain various data are transferred to perform.

In step S4, an ADAS hardware is pre-embedded for the monorail hoist, the hardware is prepared for being updated, and a corresponding hardware interface is reserved. The basic function of the shade mode are implemented by comparing the differences between the output instruction of the program and the output instruction of the reality.

In step S5, the data transmission system is taken the PLC as the core, and the data information interaction is performed through the peripheral devices such as the servo drive and the sensor, the touch screen, and the monorail hoist, and the data transmission and the state synchronization between the virtual model and the monorail hoist are completed through the OPC UA communication protocol.

In step S6, the input instruction of the driving of the entity monorail hoist is compared with the output instruction of the trained shadow mode, the data difference values for the driving time, the braking times, the acceleration times, the deceleration times between the entity monorail hoist and the shadow mode are served as the quantification indexes for evaluating the accuracy of the virtual unmanned driving, the above data difference are weighted and averaged, and a value of N is given as the standard for determining whether the prediction accuracy satisfies the requirement, $$N = k_1 m + k_2 a + k_3 b + k_4 c,$$

where $k_1$ denotes the weight of the difference value for the driving time in the formula, $k_2$ denotes the weight of the difference value for the braking times in the formula, $k_3$ denotes the weight of the difference value for the acceleration times in the formula, $k_4$ denotes the weight of the difference value for the deceleration times in the formula, m denotes the difference value for the driving time, a denotes the difference value for the braking time, b denotes the difference value for the acceleration times, c denotes the difference value for the deceleration times. When the prediction accuracy is insufficient, the artificial intelligence iterative training is performed on the virtual unmanned driving control model until the prediction accuracy reaches the available standard.

In step S7, the scene loading program is pre-processed in a designing of the program in this method. Firstly, the segmented Tile and the LOD loading module are established for the real-scene three-dimensional scene data, multi-level root nodes are formed by merging Tile on the top level of the LOD to the maximum extent for multiple times, which greatly improves the browsing velocity, and further reduces the pyramid level of the root nodes of the real-scene 3D data, reduces the data volume of the data rendering scheduling, and improves the efficiency of the rendering scheduling. Secondly, the texture compression, the triangular mesh compression, the point cloud compression, and the data file compression are performed on the real-scene 3D scene data. Finally, the real-scene 3D data are rapidly released and shared, which improves the loading and browsing velocity of the new roadway environment, and achieves the purposes of the environment adaptation, the platform adaptation, and terminal adaptation.

It will be apparent that various modifications and variations can be made by those skilled in the art in the present disclosure without departing from the spirit and scope of the present disclosure. Thus, if these modifications and variations of the present disclosure belong to the scopes of the claims of the present disclosure and their equivalents, the present disclosure is also intended to include these modifications and variations.

What is claimed is:

1. A scene self-adaptive method for controlling an unmanned driving of a monorail hoist transportation robot, comprising following steps:
   S1, constructing an industrial internet of things platform for a monorail hoist, wherein the industrial internet of things platform comprises a cloud server and a client device, the client device is in communication connection with the cloud server by using a network communication, the client device uses a sensor to acquire data and transmits the data to the cloud server for storage;
   S2, constructing a digital twin corresponding an entity monorail hoist as a virtual monorail hoist;
   S3, establishing a virtual unmanned driving control model to control driving of the virtual monorail hoist in a virtual scene, wherein when the driving of the virtual monorail hoist in the virtual scene is detected to be abnormal, point cloud data and a scene image of a current driving road of the virtual monorail hoist are acquired, and artificial intelligence training of the virtual unmanned driving control model is performed;
   S4, establishing a program for executing a shadow mode in the virtual monorail hoist, and comparing an output instruction of the program with an output instruction of the entity monorail hoist;
   S5, controlling the entity monorail hoist in real time by the virtual monorail hoist, wherein a data transmission and a state synchronization between the virtual monorail hoist and the entity monorail hoist through OPC UA (Open Platform Communications Unified Architecture) communication protocol;
   S6, comparing the entity monorail hoist driven by data and the entity monorail hoist driven by a person driver with the shadow mode; and
   S7, designing a self-adaptive program for complex scenes comprising establishing segmented tiles and the LOD (Level of Detail) loading module for real-scene three-dimensional scene data and performing data compression on the real-scene three-dimensional scene data.

2. The scene self-adaptive method for controlling the unmanned driving of the monorail hoist transportation robot according to claim 1, wherein in step S1, an ARM processor is served as a control module, and a camera module is served as an acquisition device for data acquisition; driving data for the entity monorail hoist are obtained by utilizing a millimeter-wave laser radar and a multi-sensor fusion; special operating conditions are recorded based on production data for mines; a WIFI technology is served as a network communication technology for implementing a wireless communication; a data processing server, a database server and a Web server are served as cloud servers, and eventually the data are displayed on a display terminal.

3. The scene self-adaptive method for controlling the unmanned driving of the monorail hoist transportation robot according to claim 2, wherein in step S2, the digital twin corresponding to the entity monorail hoist is constructed layer by layer, a physical layer, a virtual layer, a perception layer and a shared layer are sequentially established to further establish an operation and control model for the monorail hoist, and the client device is in communication connection with the cloud server by utilizing a WIFI or a Socket to establish a digital twin system for the monorail hoist.

4. The scene self-adaptive method for controlling the unmanned driving of the monorail hoist transportation robot according to claim 3, wherein in step S3, a virtual laser radar is constructed, and the point cloud data for the roadway are acquired; a virtual vision camera is constructed to acquire real-time scene image data for the roadway to perform a controlled driving training, a path following training, and a A*pathfinding algorithm optimization.

5. The scene self-adaptive method for controlling the unmanned driving of the monorail hoist transportation robot according to claim 4, wherein in step S4, an ADAS (Advanced Driver Assistance Systems) hardware is pre-embedded for the entity monorail hoist, differences between the output instruction of the program and the output instruction of the entity monorail hoist are compared to implement a basic function of the shadow mode.

6. The scene self-adaptive method for controlling the unmanned driving of the monorail hoist transportation robot according to claim 5, wherein in step S5, in a data transmission system, a PLC is taken as a core, and a data information interaction is performed through a servo drive, a sensor, a touch screen and the entity monorail hoist.

7. The scene self-adaptive method for controlling the unmanned driving of the monorail hoist transportation robot according to claim 6, wherein in step S6, an input instruction a driving of the entity monorail hoist is compared with an output instruction of the shadow mode, when an instruction difference does not satisfy an accuracy requirement of the unmanned driving, the virtual unmanned driving control model is retrained.

8. The scene self-adaptive method for controlling the unmanned driving of the monorail hoist transportation robot according to claim 7, wherein in step S7, a scene loading program is pre-processed in a designing of a program, optimization operations of root nodes and data compression are performed on real-scene three-dimensional scene data.

* * * * *